United States Patent Office 2,945,032
Patented July 12, 1960

2,945,032
NEW PIPERIDINIUM COMPOUNDS

Adrian Marxer, Basel, Switzerland, assignor to Ciba Pharmaceutical Products Inc., Summit, N.J., a firm
No Drawing. Filed Jan. 28, 1957, Ser. No. 636,502
Claims priority, application Switzerland Jan. 30, 1956
13 Claims. (Cl. 260—247.5)

This invention relates to new quaternary piperidinium compounds. More particularly the invention concerns 1-lower alkyl-1(R—X)-R'-piperidinium compounds in which R represents a tri-lower alkyl-ammonium group or a N-lower alkylene-N-lower alkyl-ammonium group, X stands for a lower alkylene radical and R' for a phenyl radical.

In these compounds the lower alkyl radicals are, for example, ethyl, propyl or butyl, but more especially methyl. The lower alkylene radical X preferably contains 2–4 carbon atoms and the lower alkylene radical of the N-lower alkyl-N-lower alkylene-ammonium group preferably has 4 to 5 carbon atoms and may also be interrupted by an oxygen atom. Thus the ammonium group R is preferably a trimethyl-ammonium, N-methyl-pyrrolidinium, N-methyl-piperidinium or N-methyl-morpholinium. The phenyl radical may be unsubstituted or substituted, for example by halogen, such as chlorine, bromine or iodine, free or etherified hydroxyl groups, such as lower alkoxy, e.g. methoxy, or methylene dioxy. Both, the phenyl or the piperidinium radical may carry further substituents, such as lower alkyl groups. The phenyl radical is preferably bound in the 4-position of the piperidinium radical.

The new piperidinium compounds are in the form of the free ammonium hydroxids in the form of the therapeutically useful quaternary ammonium salts. The anions of these salts are, for example, anions of strong inorganic acids, such as hydrohalic acids, for example, hydrochloric acid, hydrobromic acid or hydriodic acid, sulfuric acid, or anions of organic acids, such as alkylsulfonic acids, for example, methane sulfonic acid or ethane sulfonic acid, or aryl-sulfonic acids, for example, para-toluene sulfonic acid or naphthalene sulfonic acids, or acetic acid, oxalic acid, tartaric acid, citric acid, benzoic acid or naphthalene carboxylic, or anions of alkyl-sulfuric acids, for example, methyl-sulfuric acid.

The new compounds are distinguished by their action on the autonomic nervous system, and can be used as medicaments in disturbances due to overexcitation of the autonomic nervous system; in particular they have a specific action on the important regulating mechanisms of the autonomic and central nervous system by blocking the function of the ganglia. They can be used as ganglionic blockers for example, in cases of hypertension.

Especially valuable are compounds of the formula

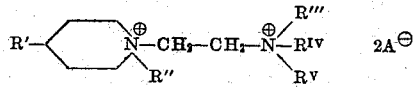

in which R' represents an unsubstituted phenyl radical or halogeno-phenyl, hydroxy-phenyl, lower alkoxy-phenyl or methylene dioxy-phenyl and preferably 2,4-dichlorophenyl or 3,4-dichlorophenyl, R''—R$^V$ stand for lower alkyl radicals, preferably methyl, and A for the anion of a therapeutically useful acid. Preferred embodiments of the invention are 1-trimethyl-ammoniumethyl-1-methyl-4-(2':4'-dichlorophenyl)-piperidinium salts of the formula

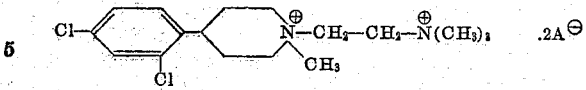

and 1-trimethyl-ammoniumethyl-1-methyl-4-(3':4'-dichlorophenyl)-piperidinium salts of the formula

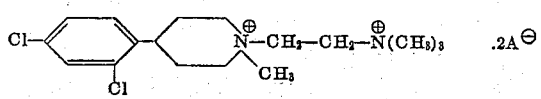

in which formulae A represents the anion of one of the acids mentioned above, and preferably a halogen atom, for example, a chlorine, bromine or iodine atom.

The new compounds are obtained by treating a 1-(R$_1$—X)-R'-piperidine, wherein X and R' have the meaning given above and R$_1$ stands for an amino group substituted by two lower alkyl radicals or a lower alkylene radical which may be interrupted by an oxygen atom, or a lower alkyl monoquaternary derivative thereof with a quaternating ester of a lower alkanol, especially a lower alkyl halide, such as methyl chloride, ethyl chloride, propyl chloride, isopropyl chloride, butyl chloride or the corresponding bromides or iodides, or a lower alkyl sulfate, e.g. dimethyl or diethyl sulfate or a benzene sulfonic acid lower alkyl ester.

The reactions are preferably carried out in the presence of a solvent, at a raised temperature, and under atmospheric or superatmospheric pressure.

Quaternary N-salts so obtained may be converted in the usual manner into their quaternary N-hydroxides, for example, by reaction of the halides with silver oxide, by reaction of the sulfates with barium hydroxide or by treating the quaternary salts with anion exchangers. From the bases so obtained therapeutically useful quaternary salts of inorganic or organic acids can be obtained by reaction with appropriate therapeutically useful acids, for example, acetic acid, propionic acid, succinic acid, tartaric acid, citric acid or benzoic acid. Furthermore, the diquaternary N-salts mentioned can be converted directly into other salts with the aid of anion exchangers.

Those starting materials which are new can be made by methods analogous to those used for the preparation of the known compounds. Thus, in order to prepare the ditertiary amines used as starting materials an aryl-glutaric acid anhydride may be reacted with a primary-tertiary alkylene diamine, and the aryl-glutaric acid imide so obtained reduced, for example, with lithium-aluminum hydride to the corresponding piperidine.

The new compounds can be used as medicaments, for example, in the form of pharmaceutical preparations which contain them in admixture with a therapeutically useful pharmaceutical organic or inorganic solid or liquid carrier material suitable for enteral or parenteral application. For the production of these preparations such substances are concerned as do not react with the new compounds, as for example water, gelatine, lactose, starch, magnesium stearate, talc, vegetable oils, benzyl alcohols, gums, polyalkylene glycols, cholesterol, or other known medicament carriers. The pharmaceutical preparations can take the form of, for example, tablets or dragees, or are in liquid form as solutions, suspensions or emulsions. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are formulated by the usual methods.

The following examples illustrate the invention:

Example 1

19.0 grams of 1-dimethylaminoethyl-4-phenylpiperidine are dissolved in 150 cc. of absolute alcohol, and at an internal temperature of 27–30° C. 28.4 grams of methyl iodide in 50 cc. of absolute alcohol are added dropwise. The whole is heated for 5 hours in a bath at 80° C., the crystals formed are isolated by filtering with suction and boiled for purification with 150 cc. of alcohol. The resulting 1-trimethylammoniumethyl-1-methyl-4-phenyl-piperidinium diiodide of the formula

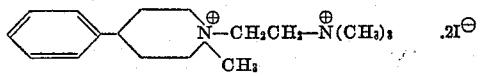

melts at 217–220° C.

The 1-dimethylaminoethyl-4-phenyl-piperidine used as starting material may be prepared, for example, as follows:

52.0 grams of 1-dimethylaminoethyl-4-phenyl-glutaric acid imide, dissolved in 250 cc. of absolute dioxane, are added dropwise at room temperature to 22.8 grams of lithium-aluminum hydride suspended in 400 cc. of absolute ether, and the whole is stirred for 12 hours in a bath at 45° C. 22.8 cc. of water, then 22.8 cc. of caustic soda solution of 15 percent strength and finally 68.4 cc. of water are added while cooling. The precipitate is filtered off with suction and washed with ether. From the ethereal solution the above mentioned diamine is obtained, boiling at 181° C. under 12 mm. pressure. It forms a dihydro-chloride of melting point 286–288° C. (decomposition).

Example 2

15.06 grams of 1-dimethylaminoethyl-4-(2':4'-dichlorophenyl)-piperidine are dissolved in 100 cc. of absolute alcohol, and 21.3 grams of methyl iodide in 40 cc. of absolute alcohol are added dropwise, while stirring and cooling with water. The whole is heated for 5 hours in a bath at 70° C. The crystals which separate out are suspended in 100 cc. of boiling alcohol and dissolved by the addition of 20 cc. of water. After filtering the mixture, crystalline 1-trimethyl-ammonium-ethyl-1-methyl-4-(2':4'-dichlorophenyl)-piperidinium diiodide of the formula

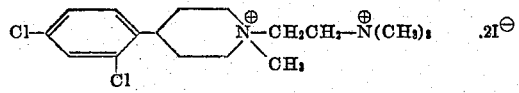

is reprecipitated by the addition of 100 cc. of absolute alcohol. It melts at 238–240° C.

The 1-dimethylaminoethyl-4-(2':4'-dichlorophenyl)-piperidine, which is obtained by a method analogous to that described in Example 1 from 1-dimethylaminoethyl-4-(2':4'-dichloro-phenyl)-glutaric acid imide, is an oil boiling at 137–140° C. under 0.1 mm. pressure. Its dihydrochloride melts at 291–293° C. (decomposition).

Example 3

28.4 grams of methyliodide, dissolved in 50 cc. of absolute alcohol, are slowly introduced dropwise, while stirring, into a solution of 27.71 grams of 1-dimethyl-aminoethyl-4-(3':4'-dichlorophenyl)-piperidine in 200 cc. of absolute alcohol. The whole is heated for 5 hours at 80° C., and the crystals formed are isolated. The latter are recrystallised by dissolution in 50 cc. of absolute alcohol and 10 cc. of water and adding 200 cc. of absolute alcohol. The resulting 1-trimethyl-ammoniumethyl-1-methyl-4-(3':4'-dichlorophenyl)-piperidinium diiodide of the formula

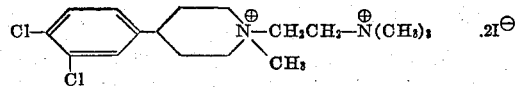

melts at 246–248° C. (decomposition).

The 1-dimethylaminoethyl-4-(3':4'-dichlorophenyl)-piperidine used as starting material is prepared in a manner analogous to that described in Example 1 from 1-dimethylamino-ethyl-4-(3':4'-dichlorophenyl)-glutaric acid imide, and is an oil boiling at 163–165° C. under 0.01 mm. pressure, and solidifying in crystalline form. Its melting point is at 49–52° C. The dihydrochloride obtained from it melts at 283–285° C. (decomposition).

Example 4

23.65 grams of 1-dimethylaminoethyl-4-(4'-methoxyphenyl)-piperidine are dissolved in 200 cc. of absolute alcohol and there is added dropwise a solution of 28.4 grams of methyl iodide in 50 cc. of absolute alcohol.

During the dropwise addition, the internal temperature is maintained at 35–40° C. and the mixture is then stirred for 8 hours under reflux. The crystals which separate on cooling are isolated and dissolved hot in isopropyl alcohol, a small quantity of water being added. On cooling, some amorphous material first separates on the walls of the vessel. This material is separated by filtration whereupon the 1-trimethyl-ammoniumethyl-1-methyl-4-(4'-methoxy-phenyl)-piperidinium diiodide separates in analytically pure form. Its melting point is at 238–241° C. (decomposition). It has the formula

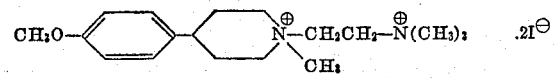

The 1-dimethylaminoethyl-4-(4'-methoxy-phenyl)-piperidine used as starting material is prepared from 1-dimethylaminoethyl-4-(4'-methoxy-phenyl)-glutarimide as described in Example 1. It is an oil boiling at 142–145° C. under a pressure of 0.03 mm., and forms a dihydrochloride of melting point 296–297° C. (decomposition).

Example 5

100 grams of 1-trimethylammoniumethyl-1-methyl-4-(3':4'-dichloro-phenyl)-piperidinium diiodide are dissolved in 2 liters of distilled water and run slowly through a column containing 750 cc. of anion exchanger saturated with chloride ions, e.g. "Amberlite IRA 400" (registered trademark). The aqeuous solution which no longer contains any iodide is evaporated under reduced pressure and the residue crystallized from 600 cc. of isopropyl alcohol. There is obtained the 1-trimethylammonium-ethyl-1-methyl-4-(3':4'-dichlorophenyl)-piperidinium dichloride of the formula

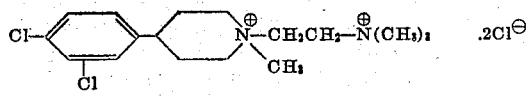

melting at 242–244° C. (decomposition).

The same product is obtained by suspending the diiodide (20 grams) in the ten-fold quantity of boiling methyl alcohol and introducing dry hydrogen chloride gas for 2 hours whilst distilling off the methyliodide formed. The methyl alcohol is evaporated and the residue crystallized from 250 cc. of isopropyl alcohol.

Example 6

47.4 cc. of 2.1 N alcoholic sodium alcoholate solution are added to a solution of 20.51 grams of 1-dimethylaminoethyl-4-(4'-hydroxy-phenyl)-piperdine-dihydrobromide in 200 cc. of 82% alcohol. There are then added to this solution dropwise 15.62 grams of methyl iodide dissolved in 50 cc. of absolute alcohol. The reaction mass is refluxed for 8 hours, cooled, and decanted to separate the resin which has deposited in small quantity on the walls of the vessel. Evaporation to half the volume is followed by dilution with 200 cc. of absolute alcohol and a second evaporation to half the volume. The crystals which have separated are isolated and dried. They melt at 245° C. with decomposition and are the 1-trimethylammoniumethyl-1-methyl-4-(4'-hydroxy-phenyl)-piperidinium monobromide-monoiodide of the formula

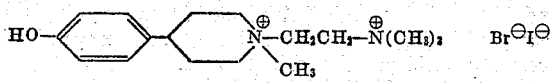

The 1-dimethylaminoethyl-4-(4'-hydroxy-phenyl)-piperidine-dihydrobromic used as starting maerial can be prepared as follows:

44 grams of the 1-dimethylaminoethyl-4-(4'-methoxyphenyl)-piperidine prepared as described in the second paragraph of Example 4 are refluxed for 2 hours in 400 cc. of 48% hydrobromic acid, the acid then evaporated under reduced pressure and the brown crystalline residue washed first with absolute alcohol and then recrystallized from 150 cc. of alcohol and 40 cc. of water. The product melts at 264–267° C. (decomposition).

Example 7

22.1 grams of 1-dimethylaminoethyl-4-(3',4'-methylenedioxyphenyl)-piperidine are dissolved in 200 cc. of alcohol and added dropwise with stirring at an internal temperature of 25–40° C. to a solution of 28.4 grams of methyl iodide in 50 cc. of absolute alcohol. The whole is then boiled for 8 hours in a bath having a temperature of 90° C. Oil droplets separate from the solution which then gradually solidify in crystalline form. After cooling, the crystals are isolated and dissolved in 300 cc. of absolute alcohol to which 28 cc. of water are added then cooled while 300 cc. of absolute alcohol are added, whereupon crystallization sets in.

The 1-trimethylammoniummethyl-1-methyl-4-(3',4'-methylenedioxy-phenyl)-piperidinium-diiodide obtained from the solution by filtering with suction melts at 227–231° C. with decomposition. It has the formula

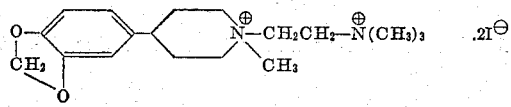

The starting material, 1-dimethylaminoethyl-4-(3',4'-methylenedioxy-phenyl)-piperidine is obtained in a manner analogous to that described in Example 1 by reducing 1-dimethylaminoethyl-4-(3',4'-methylenedixoy-phenyl)-glutarimide with lithium aluminum hydride. It is an oil which boils at 164° C. under a pressure of 0.05 mm. Its dihydrochloride melts at 285° C. with decomposition.

Example 8

31.53 grams of 1-dimethylaminopropyl-4-(2',4'-dichlorophenyl)-piperidine, dissolved in 200 cc. of absolute alcohol are reacted by the procedure of Example 7 with 31.3 grams of methyl iodide in 50 cc. of absolute alcohol. For purification, the resulting crystals are dissolved in 200 cc. of alcohol with the addition of 11 cc. of water, and precipitated in crystalline form by the addition of 200 cc. of absolute alcohol. There is obtained the 1-trimethylammoniumpropyl-1-methyl-4-(2',4'-dichlorophenyl)-piperidinium-diiodide of the formula

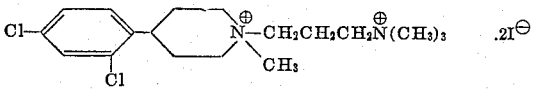

which melts at 272–275° C. with decomposition.

The 1-dimethylaminopropyl-4-(2',4'-dichloro-phenyl)-piperidine used as starting material can be obtained by the procedures of Examples 1–4 and 7 from 1-dimethylaminopropyl-4-(2',4'-dichlorophenyl)-glutarimide by reduction with lithium aluminum hydride. It forms an oil boiling at 155° C. under a pressure of 0.04 mm.

Example 9

34.33 grams of 1-morpholinoethyl-4-(2',4'-dichlorophenyl)-piperidine, dissolved in 200 cc. of absolute alcohol are reacted with 31.3 grams of methyl iodide, dissolved in 50 cc. of absolute alcohol, following the procedure of Example 7 or 8. For purification, the resulting crystals are dissolved in 200 cc. of absolute alcohol to which 51 cc. of water are added, and then precipitated by the addition of 200 cc. of alcohol. The 1-(N-methylmorpholiniumethyl)-1-methyl-4-(2',4' - dichlorophenyl)-piperidinium-diiodide obtained has a melting point of 241–245° C. (decomposition). It has the formula

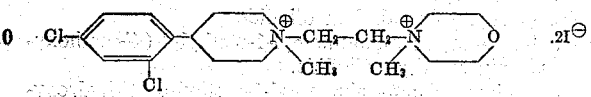

The starting material required for producing this compound is obtained by a procedure analogous to those of Examples 1–4, 7 and 8 by reducing 1-morpholinoethyl-4-(2',4'-dichloro-phenyl)-glutarimide with lithium aluminum hydride. The 1-morpholinoethyl-4-(2',4'-dichlorophenyl)-piperidine obtained is an oil of boiling point 190–194° C. under a pressure of 0.05 mm. It solidifies and then melts at 74° C.

The 1-aminoalkyl-4-phenylpiperidines used in Examples 1–4 and 7–9 are prepared as follows:

(a) 0.4 mol of the appropriate β-phenylglutaric acid anhydride and 0.4 mol of N,N-dimethyl-alkylene diamine (or morpholinoethyl amine in Example 9) are heated to 160° C. together with 40 cc. of absolute xylene, the water which forms being distilled off. 3–4 hours suffice to complete the reaction. The residue is taken up in ether, exhaustively extracted with 2N-acetic acid, and the substituted glutarimide separated from the acetic acid extract by means of dilute ammonia (8–10%). If the glutaric acid imide precipitates in the form of an oil it is taken up in ether and dried and, after the evaporation of ether, distilled; if it is obtained in crystalline form, it is filtered with suction, washed with water, and dried.

(b) Equal quantities of the appropriate β-phenylglutaric acid anhydride and diamine are boiled under reflux for 10 hours in 500 cc. of glacial acetic acid, the latter then expelled under reduced pressure, the residue dissolved in water, non-basic portions removed with ether, the resulting glutaric acid imide precipitated by means of concentrated ammonia and cooling with ice, and the product distilled or crystallized as indicated in paragraph (a).

There are obtained in this manner:

1-dimethylaminoethyl-4-phenyl-glutarimide boiling at 158–160° C. under a pressure of 0.05 mm. and melting at 104° C.;

1-dimethylaminoethyl-4-(2',4'-dichloro-phenyl) - glutarimide in crystalline form;

1-dimethylaminoethyl-4-(3',4'-dichloro-phenyl) - glutarimide, melting at 90–92° C.;

1-dimethylaminoethyl-4-(4'-methoxy-phenyl)-glutarimide melting at 96–98° C.;

1-dimethylaminoethyl-4-(3',4'-methylene-dioxy - phenyl)-glutarimide melting at 98–101° C.;

1-dimethylaminopropyl-4-(2',4'-dichloro-phenyl) - glutarimide melting at 82–84° C.;

1-morpholinoethyl-4-(2',4'-dichloro-phenyl) - glutarimide melting at 115–118° C.

What is claimed is:

1. Compounds of the formula

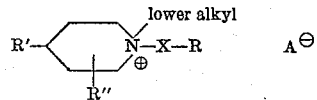

wherein R represents a member selected from the group consisting of tri-lower alkyl-quaternary ammonium, N-lower alkyl-N-lower alkylene-imino-quaternary ammonium and N-lower alkyl-morpholinium, X stands for a lower alkylene radical, R' stands for a member selected from the group consisting of phenyl, chloro phenyl, bromo phenyl, iodo phenyl, hydroxy-phenyl, lower alkoxy-phenyl, lower alkyl-phenyl and methylenedioxy-phenyl and R'' for a member selected from the group consisting of hydrogen and lower alkyl and A⊖ represents a member selected from the group consisting of the hydroxyl ion and the anion of a therapeutically useful, non-toxic acid.

2. 1-trimethylammoniumethyl-1-methyl-4-(2':4' - dichlorophenyl)-piperidinium dichloride.

3. 1-trimethylammonium-ethyl-1-methyl-4-(3':4' - dichlorophenyl)-piperidinium diiodide.

4. 1-trimethylammoniumethyl-1-methyl-4-(4'-methoxyphenyl)-piperidinium diiodide.

5. 1-trimethylammoniumethyl-1-methyl-4-(4'-hydroxyphenyl)-piperidinium bromide-iodide.

6. 1-trimethylammoniumethyl-1-methyl-4-(3':4'-methylenedioxy-phenyl)-piperidinium diiodide.

7. 1-trimethylammoniumpropyl-1-methyl-4-(2':4' - dichloro-phenyl)-piperidinium diiodide.

8. 1-(N-methyl-morpholinium-ethyl)-4-(2':4' dichlorophenyl)-piperidinium diiodide.

9. Compounds of the formula

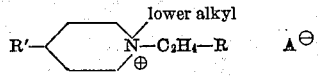

in which R' represents phenyl, R stands for tri-lower alkyl-quaternary ammonium and A⊖ represents the anion of a therapeutically useful, non-toxic acid.

10. A member selected from the group consisting of the formula

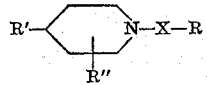

wherein R stands for a member selected from the group consisting of di-lower alkylamino, lower alkylene amino, and morpholino, R' represents a member selected from the group consisting of phenyl, chloro phenyl, bromo phenyl, iodo phenyl, hydroxy-phenyl, lower alkoxy phenyl, lower alkyl-phenyl and methylenedioxy-phenyl and R'' stands for a member selected from the group consisting of hydrogen and lower alkyl, and therapeutically acceptable acid addition salts thereof.

11. Compounds of the formula

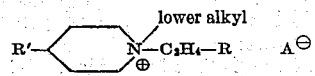

in which R' represents chlorophenyl, R stands for tri-lower alkyl-quaternary ammonium and A⊖ represents the anion of a therapeutically useful, non-toxic acid.

12. Compounds of the formula

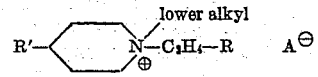

in which R' represents lower alkoxy-phenyl, R stands for tri-lower alkyl-quaternary ammonium and A⊖ represents the anion of a therapeutically useful, non-toxic acid.

13. Compounds of the formula

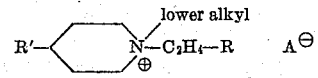

in which R' represents methylenedioxy-phenyl, R stands for tri-lower alkyl-quaternary ammonium and A⊖ represents the anion of a therapeutically useful, non-toxic acid.

References Cited in the file of this patent

UNITED STATES PATENTS 2,746,967    Biel _____ May 22, 1956

FOREIGN PATENTS 519,741    Canada _____ Dec. 20, 1955

UNITED STATES PATENT OFFICE
CERTIFICATE OF CORRECTION

Patent No. 2,945,032　　　　　　　　　　　　　　　July 12, 1960

Adrian Marxer

It is hereby certified that error appears in the printed specification of the above numbered patent requiring correction and that the said Letters Patent should read as corrected below.

Column 1, line 31, after "ium", and before the period, insert -- group --; line 50, after "carboxylic" and before the comma, insert -- acids --; column 2, lines 11 to 14, and column 4, lines 49 to 52, the left-hand portion of the formula, each occurrence, should appear as shown below instead of as in the patent:

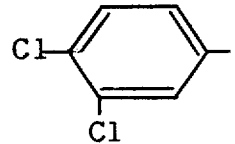

column 4, line 62, for "2.1" read -- 2.11 --; column 7, line 18, for "(2':4'dichloro-" read -- (2':4'-di-chloro- --.

Signed and sealed this 18th day of April 1961.

(SEAL)

Attest:

ERNEST W. SWIDER
Attesting Officer

DAVID L. LADD
Commissioner of Patents